(12) United States Patent
Park et al.

(10) Patent No.: US 9,071,590 B2
(45) Date of Patent: Jun. 30, 2015

(54) APPARATUS AND METHOD FOR REGISTERING PERSONAL NETWORK

(75) Inventors: Sung-Jin Park, Hwaseong-si (KR); Yang-Un Lee, Gyeonggi-do (KR); Seok-Hoon Choi, Seoul (KR); Wuk Kim, Anyang-si (KR)

(73) Assignee: Samsung Electronics Co., Ltd (KR)

( * ) Notice: Subject to any disclaimer, the term of this patent is extended or adjusted under 35 U.S.C. 154(b) by 387 days.

(21) Appl. No.: 13/161,111

(22) Filed: Jun. 15, 2011

(65) Prior Publication Data

US 2011/0307620 A1 Dec. 15, 2011

(30) Foreign Application Priority Data

Jun. 15, 2010 (KR) .......................... 10-2010-0056693

(51) Int. Cl.
| | |
|---|---|
| G06F 15/16 | (2006.01) |
| H04L 29/06 | (2006.01) |
| H04L 12/28 | (2006.01) |
| H04W 4/00 | (2009.01) |
| H04W 4/20 | (2009.01) |
| H04L 29/08 | (2006.01) |

(52) U.S. Cl.
CPC ............ *H04L 63/08* (2013.01); *H04L 12/2809* (2013.01); *H04W 4/001* (2013.01); *H04W 4/008* (2013.01); *H04W 4/203* (2013.01); *H04L 67/28* (2013.01)

(58) Field of Classification Search
None
See application file for complete search history.

(56) References Cited

U.S. PATENT DOCUMENTS

| 7,103,912 | B2 * | 9/2006 | Xia et al. ........................ 726/8 |
| 2005/0015462 | A1 | 1/2005 | Lee et al. |
| 2006/0200541 | A1 | 9/2006 | Wikman et al. |
| 2013/0077531 | A1 * | 3/2013 | Chu et al. ...................... 370/255 |
| 2013/0077532 | A1 * | 3/2013 | Deprun et al. ................. 370/255 |
| 2013/0086246 | A1 * | 4/2013 | Lee et al. ...................... 709/223 |
| 2013/0208626 | A1 * | 8/2013 | Lee et al. ...................... 370/255 |

FOREIGN PATENT DOCUMENTS

| CN | 101299859 | | 11/2008 |
| CN | 101309509 | | 11/2008 |
| CN | 101820370 A | * | 9/2010 |
| CN | 101820482 A | * | 9/2010 |
| EP | 2166790 A1 | * | 3/2010 |
| KR | 1020040079472 | | 9/2004 |
| KR | 1020050072333 | | 7/2005 |
| WO | WO 2009/018778 | | 2/2009 |

OTHER PUBLICATIONS

Chinese Office Action dated Oct. 30, 2014 issued in counterpart application No. 201180038642.5.

* cited by examiner

*Primary Examiner* — Jeffrey R Swearingen
(74) *Attorney, Agent, or Firm* — The Farrell Law Firm, P.C.

(57) ABSTRACT

A method for a Personal Network Entity (PNE) to individually join a desired Personal Network (PN) is provided. When the PNE transmits a PN connection request message to a PN gateway, the PN gateway inserts its information into the connection request message and forwards the connection request message to a Converged Personal Network Service (CPNS) server. The CPNS server, upon receipt of the connection request message through the PN gateway, generates and manages information about a PN related to the PN gateway. The information about the PN is provided to the PNE at execution of authentication with the PNE, such that the PNE can determine whether to join the PN.

10 Claims, 3 Drawing Sheets

APPARATUS AND METHOD FOR REGISTERING PERSONAL NETWORK

PRIORITY

This application claims priority under 35 U.S.C. §119(a) to a Korean Patent Application filed in the Korean Intellectual Property Office on Jun. 15, 2010 and assigned Serial No. 10-2010-0056693, the entire disclosure of which is incorporated herein by reference.

BACKGROUND OF THE INVENTION

1. Field of the Invention

The present invention relates generally to a device capable of performing Near-Field Communication (NFC), and more particularly, to an apparatus and method by which a device capable of performing NFC is provided with a service from a Wide Area Network (WAN) by using a communication function of a device capable of accessing a Local Area Network (LAN) and the WAN.

2. Description of the Related Art

As the use of Consumer Electronics devices (CE) capable of performing Near-Field Communication (NFC), for example, MP3 players, Portable Multimedia Players (PMPs), game players, netbooks, and the like, exponentially increases, users seek a convenient method of downloading content.

Users generally search for content reproducible in a CE by using a Personal Computer (PC) over the Internet, and download the content found in the PC. When the CE and the PC are connected using a dedicated cable, the CE downloads the content from the PC. Through this process, the CE can then reproduce the downloaded content. Presently, devices can share content by using a Bluetooth scheme in place of the cable.

However, a method for a CE itself to directly access a WAN) is still limited. For example, some CEs can access the WAN only when the Internet is available to them through Wireless Fidelity (WiFi) in the vicinity of an Access Point (AP). Consequently, there is a need for a method in which devices, that is, CEs, which can perform NFC, but cannot directly access the WAN, access the WAN through a gateway to use a desired service, for example, to download content. To meet the need, a Converged Personal Network Service (CPNS) has been proposed.

CPNS refers to a service in which, after a Personal Network (PN) is configured by combining a device serving as a gateway for performing communication with the WAN with a CE for reproducing a service and content, the CE accesses a service and/or content provider in the WAN through the device serving as the gateway to be provided with a corresponding service or content. In the CPNS, the device serving as the gateway is referred to as a PN gateway and the CE connected to the PN gateway through NFC to access the WAN through the PN gateway is referred to as a Personal Network Entity (PNE).

SUMMARY OF THE INVENTION

As described above, by establishing a PN with various PNEs around the PN gateway for the CPNS, the PNEs can access a CPNS server through the PN gateway. Currently, in order to provide the CPNS service, a plurality of PNEs must be registered in the CPNS server by being grouped with the PN gateway. Once the plurality of PNEs are registered in the CPNS server, the ability to join other PNEs in the established PN is limited. Moreover, currently, there is no specific proposal as to how to individually manage the PNEs in the CPNS server.

Therefore, if the PNE can individually determine whether to and when to join the PN, it can be efficiently provided with the CPNS. Consequently, there is a need for a method for efficiently providing the CPNS.

Accordingly, an aspect of the present invention is to provide an apparatus and method for a PNE to individually perform a registration process to join a desired PN.

Another aspect of the present invention is to provide an apparatus and method for a CPNS server to individually manage a PNE.

Another aspect of the present invention is to provide an apparatus and method for efficiently providing a CPNS.

According to an embodiment of the present invention, a method for registering a Personal Network (PN) at a Personal Network Entity (PNE), which is provided with a service from a server in a Wide Area Network (WAN) through a Personal Network (PN) gateway is provided. The method includes transmitting a PN connection request message to the server through the PN gateway, receiving an authentication request message from the server, determining whether a PN list including the PN gateway is included in the received authentication request message, and if the PN list is included, transmitting an authentication response message including information about a joining PN to the server through the PN gateway.

According to another embodiment of the present invention, there is provided a method for registering a Personal Network (PN) at a server in a Wide Area Network (WAN) at a request of a Personal Network Entity (PNE), which is provided with a service from the server through a Personal Network (PN) gateway. The method includes receiving a PN connection request message from the PNE through the PN gateway, searching for a PN list corresponding to information about the PN gateway included in the PN connection request message, if the PN list is found, transmitting an authentication request message including the PN list to the PNE, upon receipt of an authentication response message from the PNE, acquiring PN information included in the received authentication response message, and forcing the PNE to join a PN corresponding to the PN information.

According to another embodiment of the present invention, there is provided a Personal Network Entity (PNE), which is provided with a service from a server in a Wide Area Network (WAN) through a Personal Network (PN) gateway. The PNE includes a Near-field Communication (NFC) module for communicating with the PN gateway, a PN connection controller for transmitting a PN connection request message to the server through the PN gateway, and an authenticator for, upon receipt of an authentication request message from the server, receiving a response to an authentication query included in the received authentication request message and generating an authentication response message including the acquired response to the authentication query, in which the PN connection controller determines whether a PN list including the PN gateway is included in the received authentication request message and, if the PN list is included, inserts information about a joining PN into the authentication response message and transmits the authentication response message to the server through the PN gateway.

According to another embodiment of the present invention, there is provided a server in a Wide Area Network (WAN), which provides a service to a Personal Network Entity (PNE) through a Personal Network (PN) gateway. The server includes a wide-area module for communicating with the PN gateway, a storage unit for storing a PN list corresponding to information about the PN gateway, a PN manager for, upon receipt of a PN connection request message from the PNE through the PN gateway, searching for the PN list corresponding to the information about the PN gateway included in the PN connection request message, and transmitting an authentication request message including the PN list to the PNE if the PN list is found, and an authenticator for, upon receipt of an authentication response message from the PNE, authenticating the PNE by using the received authentication response message, in which if the authentication is successful, the PN manager receives PN information included in the received authentication response message and causes the PNE to join a PN corresponding to the PN information.

BRIEF DESCRIPTION OF THE DRAWINGS

The above and other features and advantages of an embodiment of the present invention will be more apparent from the following detailed description taken in conjunction with the accompanying drawings, in which.

DETAILED DESCRIPTION OF EMBODIMENTS OF THE PRESENT INVENTION

Figure 1:
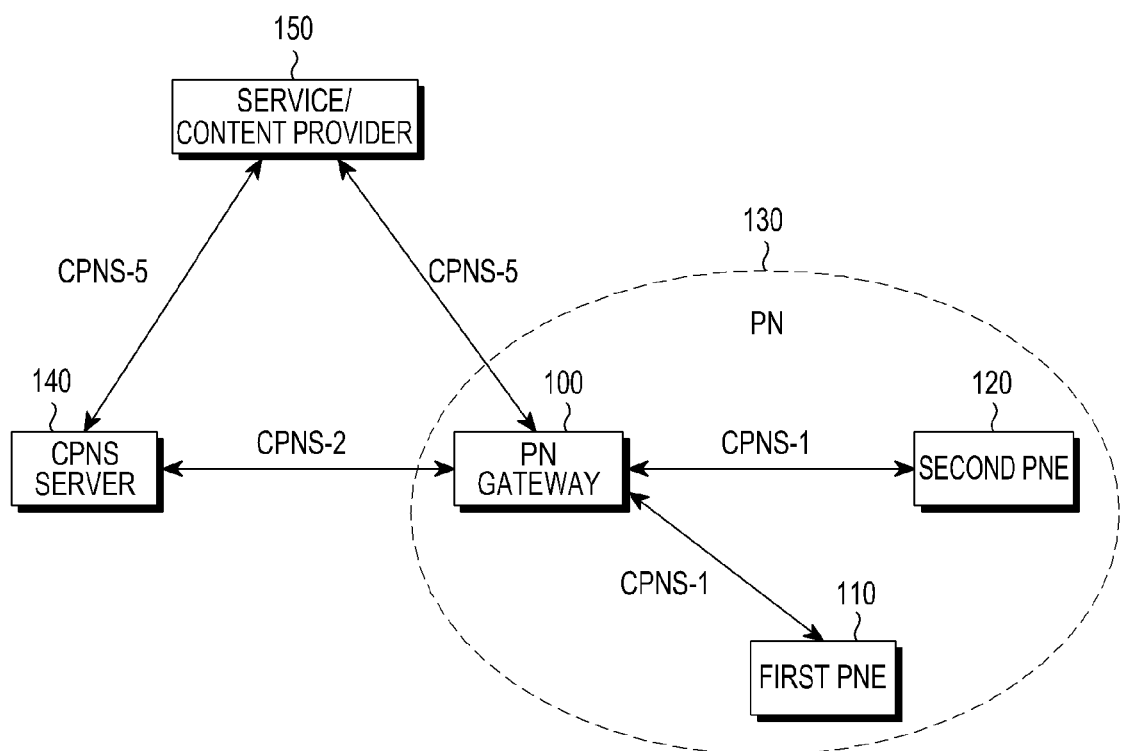
FIG. 1 illustrates a Converged Personal Network Service (CPNS) system according to an embodiment of the present invention.

Hereinafter, an embodiment of the present invention will be described in detail with reference to the accompanying drawings. In the drawings, the same or similar elements are denoted by the same reference numerals and symbols even though they are depicted in different drawings. A detailed description of known functions and configurations will be omitted when it may obscure the subject matter of the present invention.

The following description provides a representative example for achieving the foregoing technical objects in the present invention. In addition, names of entities defined in the Converged Personal Network Service (CPNS) of the Open Mobile Alliance Mobile Broadcast Service (OMA BCAST), a standard group for applications of mobile terminals, will herein be also used for convenience, but these standard and names do not limit the scope of the present invention, and the present invention can be applied to any system having similar features.

The present invention includes a method for an individual Personal Network Entity (PNE) to join a desired PN. Once the PNE transmits a PN connection request message to a PN gateway, the PN gateway inserts information about itself into the PN connection request message and forwards the PN connection request message to a CPNS server. The CPNS server, upon receipt of the PN connection request message through the PN gateway, generates and manages information about a PN related to that PN gateway. The information about the PN is provided to the PNE at authentication with respect to the PNE. As the information about the PN is provided to the PNE, the PNE can determine whether to join the PN.

The PN is established by connecting a PNE or a plurality of PNEs to a PN gateway. The PN can use a CPNS service only after being registered in the CPNS server. This registration process may be called PN registration. A process in which one of the PNEs is connected to the PN gateway and is registered in the CPNS server may be called PNE registration.

An example of a CPNS system in which this function is implemented will be described with reference to FIG. 1.

Referring to FIG. 1, a CPNS system, according to the present invention, may include one or more PNEs (e.g., a first PNE 110 and a second PNE 120), a PN gateway 100, a CPNS server 140, and a service and/or content provider 150 serving as an application server.

The service and/or content provider 150 is present in a WAN and provides various services and content.

The first PNE 110 and the second PNE 120 directly consume services and content, such as for example, MP3 players, PMPs, and the like. The first PNE 110 and the second PNE 120 are provided with content requested by a user from the service and/or content provider 150 and reproduce the content, providing a service to the user. The first PNE 110 and the second PNE 120 can perform NFC with other nearby devices, i.e., PNEs, through Near-Field Communication (NFC) modules embedded therein. However, the first PNE 110 and the second PNE 120 have no communication modules capable of accessing a WAN and, thus, cannot directly access a service-providing operator. The WAN may be, for example, the Internet, a portable telephone network, or the like. The PNE is also called a PN device entity.

Thus, the first PNE 110 and the second PNE 120 establish a PN 130 with the PN gateway 100 through NFC. Establishing the PN 130 refers to checking support for a PNS between the first and second PNEs 110 and 120 and the PN gateway 100 (e.g., a CPNS), and checking roles of devices, thereby establishing a network in terms of an application for providing the CPNS.

The PN 130, established in this way, may include the PN gate 100 and several first and second PNEs 110 and 120 connected to it, and through the PN 130, the first and second PNEs 110 and 120 can use a function of the PN gateway 100 which can access the WAN. Thus, the first and second PNEs 110 and 120 can use the CPNS by which they access the CPNS server 140 through the PN gateway 100 and are provided with content from the service and/or content provider 150.

The PN gateway 100 can access the CPNS server 140 present in the WAN, that is, an operator network. The PN gateway 100 may establish the PN 130 with the first and second PNEs 110 and 120, and relay transmission of a CPNS system message, a service, or content between the CPNS server 140 and the first and second PNEs 110 and 120. That is, once the first and second PNEs 110 and 120 in the PN 130 transmit a service request message, the PN gateway 100 relays the service request message to forward the service request message to the CPNS server 140. When the service and/or content provider 150 provides the requested service to the PN gateway 100, the PN gateway 100 then forwards the service to the first and second PNEs 110 and 120.

The PN gateway 100, upon receipt of a connection (or registration) request message from the first PNE 110, inserts information about the PN gateway 100 into the received connection request message and forwards the connection request message to the CPNS server 140 for information about routing from the CPNS server 140 to the first PNE 110 and for indication of existence of a PN list including the PN gateway

100. The PN gateway 100, upon receipt of a connection request message from the second PNE 120, also inserts information about the PN gateway 100 into the received connection request message and forwards the connection request message to the CPNS server 140 as in the case of the first PNE 110. Thus, for the independent registration of each of the first and second PNEs 110 and 120, upon each receipt of a connection request message, the PN gateway 100 forwards the received connection request message to the CPNS server 140.

The PN gateway 100 forwards the information about itself to the CPNS server 140, together with the connection request message, such that the CPNS server 140 can manage and search for the PN list related to the PN gateway 100. Thus, registration and management of a PNE are managed and performed by the CPNS server 140, and the PN gateway 100 manages forwarding of a connection (or registration) request message including information about itself. Thus, the PN gateway 100 does not need to directly modify or generate a new registration message (i.e., Payload) in a PNE registration procedure, reducing a load in terms of process handling of the PN gateway 100.

The CPNS server 140, upon receipt of the connection or registration request message from the first and second PNEs 110 and 120 through the PN gateway 100, registers the PN 130 including the PN gateway 100 and the first and second PNEs 110 and 120. The CPNS server 140 generates a list of multiple networks to manage. Such a PN list, in response to a connection or registration request message of a PNE, is provided to the PNE from the CPNS server 140 at execution of authentication.

For registration in the CPNS server 140, the first and second PNEs 110 and 120 may be included in a PN to or in which they desire to be connected or registered based on the PN list. This process may be referred to as "joining" of the first and second PNEs 110 and 120 in the PN.

Herein, the PN list refers to information about PN identities, a PN gateway included in a corresponding PN, and identities of PNEs and information about all PNs registered in the CPNS server 140, i.e., in a PN inventory. In the following table, the PN list, like the PN inventory, may include information about a PN GateWay (PN GW Info.) and device information regarding a PNE (Device Info.). Table 1 shows an example of a configuration of the PN inventory.

TABLE 1

| Personal Network #1 - Identity | |
| --- | --- |
| PN GW Info. (Identity) | |
| PNE #1 (Identity) | |
| Device Info. | |
| Parameter | Value |
| Device Name | Portable Media Player |
| Network Interface | Bluetooth |
| Bandwidth | 1 Mbps |
| Storage | 2048 MB |
| I/O Interface | Display, Mic, Speaker |
| Video Codec | H.264 |
| Audio Codec | AC3 |
| Display size | 6 × 4 inch |
| Resolution | 1024 × 768 |
| Battery | 30 W |
| ... | ... |
| content Info. | |
| Music | Seo Tai-Ji Album #8 |
| Movie | Terminator #4 |
| ... | ... |
| PNE #2 | |
| PNE #3 | |

TABLE 1-continued

| Personal Network #2 - Identity |
| --- |
| PN GW Info. |
| Device #1 |
| ... |

The following table shows an example of a configuration of the PN list.

TABLE 2

| Personal Network #1 - Identity |
| --- |
| PN GW Identity |
| PNE #1 Identity |
| PNE #2 Identity |
| PNE #3 Identity |
| Personal Network #2 - Identity |
| PN GW Identity |
| PNE #4 |
| PNE #5 |
| ... |

The CPNS server 140 also processes a service or content request message from the first and second PNEs 110 and 120 through the PN gateway 100. If the requested service or content can be provided by the CPNS server 140, the CPNS server 140 then provides the requested service or content to the first and second PNEs 110 and 120 through the PN gateway 100. However, if it cannot be provided, the CPNS server 140 forwards the service or content request message to the service and/or content provider 150 to provide the requested service or content to the first and second PNEs 110 and 120 through the PN gateway 100.

Figure 2:
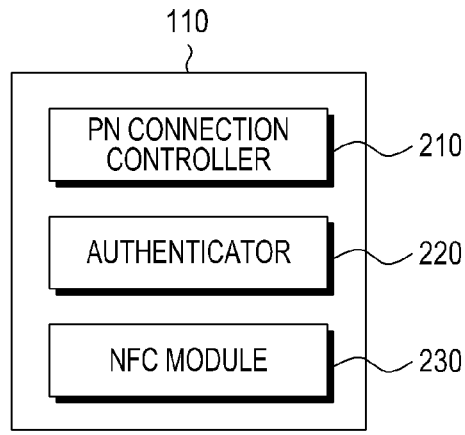
FIG. 2 is a block diagram illustrating a Personal Network Entity (PNE) according to an embodiment of the present invention.
Figure 3:
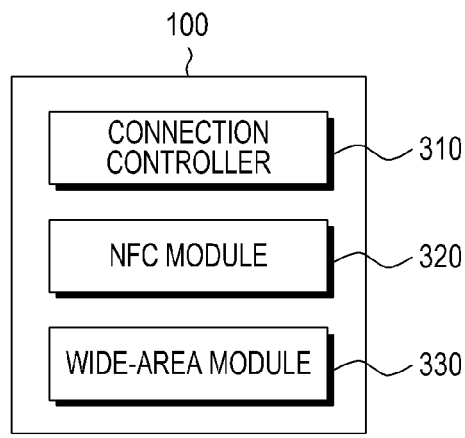
FIG. 3 is a block diagram illustrating a Personal Network (PN) gateway according to an embodiment of the present invention.
Figure 4:
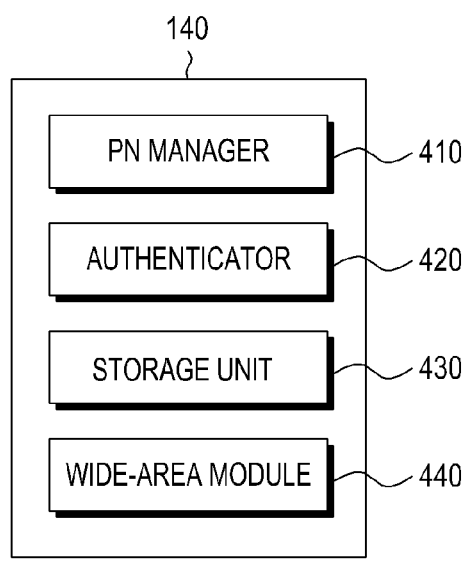
FIG. 4 is a block diagram illustrating a CPNS server according to an embodiment of the present invention.

Referring to FIGS. 2 through 4, a description will now be made of detailed operations of the first and second PNEs 110 and 120, the PN gateway 100, and the CPNS server 140 which form the CPNS system described above.

Although FIG. 2 is a block diagram illustrating the first PNE 110 according to an embodiment of the present invention, it may also be applied to the second PNE 120. For the sake of convenience, registration and authentication will be described with respect to the first PNE 110 on behalf of both the first PNE 110 and the second PNE 120. Referring to FIG. 2, the first PNE 110 may include a PN connection controller 210, an authenticator 220, and an NFC module 230.

The PN connection controller 210 controls all operations of the first PNE 110 related to establishment, registration, and deregistration of a PN, and controls operations related to requesting and reception of a service or content through the established PN. Thus, the PN connection controller 210 performs physical pairing with peripheral devices by controlling the NFC module 230 to configure the PN, thus forming a communication link.

The PN connection controller 210 searches for the PN gateway 100 among the physically paired devices, and when it detects PN gateway 100, transmits a request message for connection to the PN to the PN gateway 100. The connection request message transmitted to the PN gateway 100 may include device information regarding the first PNE 110.

The authenticator 220, upon receipt of an authentication request message from the CPNS server 140 through the PN gateway 100, receives a response to an authentication query. The PN connection controller 210 then determines whether a PN list is included in the authentication request message. If not, the PN connection controller 210 generates an authentication response message including only the response to the authentication query generated by the authenticator 220, and transmits the generated authentication response message to the CPNS server 140 through the PN gateway 100. Once the CPNS server 140 completes authentication with respect to the first PNE 110, establishment and registration of the PN are completed.

However, if the authentication request message includes the PN list, the PN connection controller 210 receives information about whether the first PNE 110 is to join a PN included in the PN list. The first PNE 110 may further include an input unit for receiving a selection of whether the first PNE 110 is to join the PN from a user. The user of the first PNE 110 may input the selection of whether to join the PN through a user interface as the input unit provided by the first PNE 110. Upon receipt of an input regarding PN joining from the user, the PN connection controller 210 adds PN identity information regarding the PN, which the first PNE 110 is to join to the authentication response message generated by the authenticator 220. The PN connection controller 210 may also request establishment of a new PN instead of joining in a PN provided in the PN list.

As such, the user of the first PNE 110 may select whether to join an existing PN based on the provided PN list at execution of authentication with the CPNS server 140 or may request a new PN to be established. If a request message to establish a new PN is input from the user, the PN connection controller 210 may transmit information indicating that establishment of the new PN is requested through the authentication response message. For example, by transmitting an identifier "New" or a blank through the authentication response message, it may be indicated that establishment of the new PN is requested.

FIG. 3 is a block diagram illustrating the PN gateway 100 according to an embodiment of the present invention. Referring to FIG. 3, the PN gateway 100 may include a connection processor 310, an NFC module 320, and a wide-area module 330.

The connection processor 310 controls the overall operation of the PN gateway 100. The connection processor 310, upon receipt of a connection request message from the paired first PNE 110, inserts information about the PN gateway 100 into the connection request message and forwards the connection request message to the CPNS server 140.

The NFC module 320 is a module for performing NFC with the first PNE 110, for example, a module for performing Bluetooth communication, Zigbee communication, Infrared Data Association (IrDA), Visible-Light Communication (VLC), WiFi communication, and the like.

The wide-area module 330 is a module for transmitting and receiving a message and data with the CPNS server 140, for example, a module for performing cellular communication, Asynchronous Transfer Mode (ATM) communication, and the like.

FIG. 4 is a block diagram illustrating the CPNS server 140, according to an embodiment of the present invention. Referring to FIG. 4, the CPNS server 140 may include a PN manager 410, an authenticator 420, a storage unit 430, and a wide-area module 440.

The PN manager 410 controls the overall operation of the CPNS server 140, and upon receipt of a connection request message including information about the PN gateway 100, analyzes the received connection request message. Once the PN manager 410 receives the information about the PN gateway 100 through the analysis, the PN manager 410 searches for a PN list corresponding to the acquired information about the PN gateway 100 in the storage unit 430.

If the corresponding PN list is found, the PN manager 410 inserts the found PN list into an authentication request message generated by the authenticator 420. If there is no PN list found, the connection request message from the first PNE 110 is the first registration request message from the PN gateway 100 and, thus, there is no PN list stored on the storage unit 430. Thus, the PN manager 410 may insert information indicating the absence of a registered PN list into the authentication request message.

The CPNS server 140 receives an authentication response message in response to the authentication request message. If the received authentication response message is a response message to the authentication request message, which includes no registered PN list or includes information indicating absence of the registered PN list, the PN manager 410 generates a PN list in which the PN gateway 100 and the first PNE 110 are registered as a PN. The generated PN list is stored in the storage unit 430. After the PN list is stored, it may be updated and stored each time a list of PNEs joining the registered PN is updated.

If the received authentication response message is a response message to the authentication request message including the found PN list, the PN manager 410 processes PN identity information or a request to establish a new PN. Thus, the PN manager 410 causes the first PNE 110 to join a registered PN corresponding to the PN identity information as requested by the first PNE 110, and then updates the PN list or generates a new PN list. Thereafter, the PN manager 410 transmits an OK message indicating that the first PNE 110 joins the registered PN or the new PN to the first PNE 110.

The authenticator 420, upon receipt of a connection (or registration) request message, generates an authentication request message including an authentication query for authentication with respect to the first PNE 110 according to an authentication mechanism of the CPNS server 140. A detailed description of the CPNS server 140 will not be provided herein. The generated authentication request message is forwarded to the PN gateway 100 through the first PNE 110. If there is a PN list found by the PN manager 410, the authentication request message includes the found PN list; if there is no PN list found, only the authentication request message is forwarded to the first PNE 110. Meanwhile, if there is no PN list found found, the authentication request message may include information indicating the absence of a registered PN list.

Upon receipt of the authentication response message from the first PNE 110, the authenticator 420 authenticates with respect to the first PNE 110 by comparing a value corresponding to the authentication query included in the received authentication response message with a value owned by the authenticator 420. If authentication with respect to the first PNE 110 is successful, the authenticator 420 notifies the PN manager 410 of the success, such that the PN manager 410 can perform the subsequent procedure for PN registration or joining.

The wide-area module 440 performs communication between the CPNS server 140 and the PN gateway 100.

Figure 5:
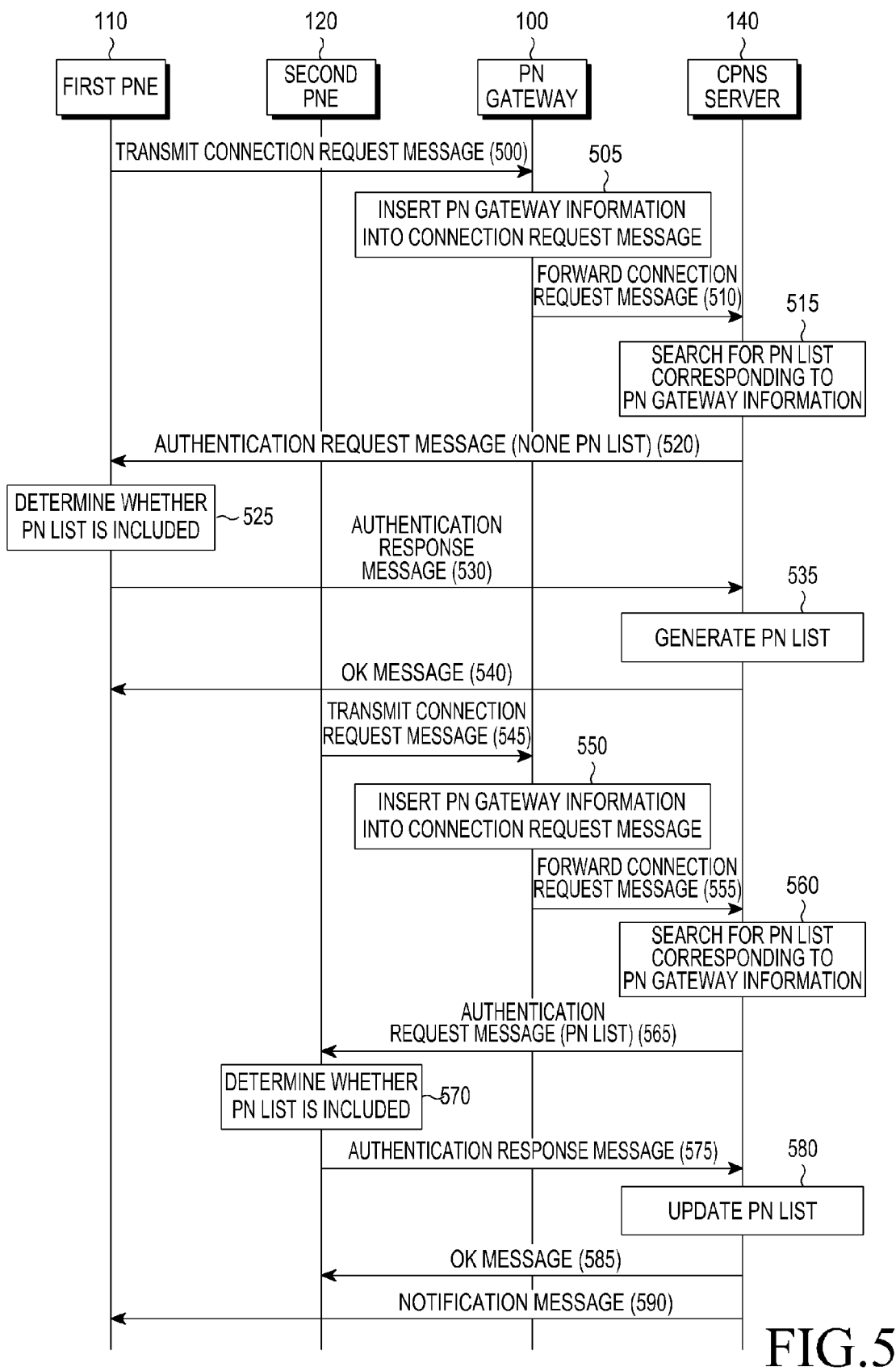
FIG. 5 is a diagram showing a process in which a PNE individually joins a PN according to an embodiment of the present invention.

With reference to FIG. 5, a process in which a PNE individually joins a PN according to an embodiment of the present invention will be described. In FIG. 5, it is assumed that at physical pairing between the PN gateway 100 and the first and second PNEs 110 and 120, authentication and authorization are first performed in terms of Personal Area Network (PAN) technology, and between the PN gateway 100 and the first and second PNEs 110 and 120, roles of CPNS entities of each device are known through a CPNS entity discovery procedure. In FIG. 5, the first PNE 110 accesses the PN gateway 100 to form an initial PN and then the second PNE 120 joins a desired PN.

Referring to FIG. 5, the first PNE 110 transmits a connection request message to the PN gateway 100 in step 500. The connection request message may include information about the first PNE 110, that is, device information. The PN gateway 100 inserts information about the PN gateway 100 into the connection request message in step 505 and forwards the connection request message to the CPNS server 140 in step 510.

The CPNS server 140, after acquiring the information about the PN gateway 100 by analyzing the connection request message, searches for a PN list corresponding to the acquired information about the PN gateway 100 in step 515. Since the connection request message is a registration request message for an initial PN establishment, the PN list is not found. Thus, the CPNS server 140 transmits an authentication request message for authenticating the first PNE 110 to the first PNE 110 through the PN gateway 100 in step 520. The authentication request message includes an authentication query for authenticating whether the first PNE 110 is a device capable of using a CPNS. The authentication request message does not include the PN list because there is no PN list found, and instead, the authentication request message may include information indicating the absence of a registered PN list.

The first PNE 110, upon receipt of the authentication request message, calculates a value corresponding to the authentication query. The first PNE 110 also determines whether the PN list is included in the authentication request message in step 525. If no PN list is included in the authentication request message, the first PNE 110 transmits an authentication response message including only the value corresponding to the authentication query to the CPNS server 140 through the PN gateway 100 in step 530.

The CPNS server 140, upon receipt of the authentication response message, authenticates by comparing the corresponding value included in the received authentication response message with a value owned by the CPNS server 140. If these values match and, thus, the authentication with respect to the first PNE 110 is successful, the CPNS server 140 registers the PN gateway 100 and the first PNE 110 as a PN, and generates and stores a PN list including registered PN identity information, information about the PN gateway 100, and information about the first PNE 110 in step 535. The PN list is configured and managed for each PN to which PN identity information may be allocated. Thereafter, the CPNS server 140 forwards an OK message indicating completion of PN registration to the first PNE 110 through the PN gateway 100 in step 540.

The above-described process is an example of PN establishment and registration for the first PNE 110. After completion of PN establishment and registration, the second PNE 120 may join a desired PN independently of the first PNE 110 as described below.

When the second PNE 120 transmits a connection request message to the PN gateway 100 in step 545, the PN gateway 100 inserts information about itself into the connection request message in step 550. When the PN gateway 100 transmits the connection request message to the CPNS server 140 in step 555, the CPNS server 140 receives the information about the PN gateway 100 from the connection request message and then searches for a PN list corresponding to the information about the gateway 100 in step 560. Operations in steps 545 through 560 are the same as those in steps 500 through 515.

Since the PN list based on the information about the PN gateway 100 has already been stored during the PN establishment and registration of the first PNE 110, the PN list corresponding to the acquired information about the PN gateway 100 is found. Thus, the CPNS server 140 transmits an authentication request message for authentication with respect to the second PNE 120 to the second PNE 120 through the PN gateway 100. This authentication request message includes the found PN list.

As such, the CPNS server 140 authenticates a PNE, which transmits a connection request message upon every reception of the connection request message. Thus, the CPNS server 140 can individually authenticate each PNE and provide a PN list to each PNE, allowing a PNE requesting PN registration later to join a particular PN. According to the present invention, the CPNS server 140 delivers a PN list while performing authentication, thereby reducing the number of exchanged messages when compared to execution of an independent procedure for registration and authentication of a plurality of PNEs with respect to a single PN. Thus, a load of a network resource can be reduced.

The second PNE 120, upon receipt of the authentication request message, calculates a value corresponding to an authentication query, and determines whether a PN list is included in the authentication request message in step 570. If the second PNE 120 wants to join a PN included in the PN list, it inserts PN identification information, together with the corresponding value, into an authentication response message. However, if the second PNE 120 desires to establish a new PN other than PNs included in the PN list, it inserts a request to establish the new PN, together with the corresponding value, into the authentication response message. The second PNE 120 then transmits the authentication response message to the CPNS server 140 through the PN gateway 100. As such, the second PNE 120, may be registered in the new PN or may join a desired PN, by being provided with the PN list.

The CPNS server 140, upon receipt of the authentication response message, authenticates with respect to the second PNE 120 by using the corresponding value included in the authentication response message. In response to the PN identity information or the request to establish the new PN included in the authentication response message, the CPNS server 140 then causes the second PNE 120 to join a PN corresponding to the PN identity information or registers the second PNE 120 and the PN gateway 100 as a new PN. Thus, the CPNS server 140 updates the PN list in step 580. As the second PNE 120 joins the PN, which the first PNE 110 already joins, a PNE list also changes, and, thus, the CPNS server 140 also updates an existing PN list. On the other hand, if the second PNE 120 requests establishment of a new PN, the CPNS server 140 generates a new PN list. In step 585, the CPNS server 140 transmits an OK message indicating that the second PNE 120 joins its desired PN, that is, the PN established by the first PNE 110, or is registered as a new PN, to the second PNE 120 through the PN gateway 100. If the second PNE 120 joins the PN established by the first PNE 110, the CPNS server 140 transmits a notification message for notifying the first PNE 110 that the second PNE 120 joins the PN, to the first PNE 110 through the PN gateway 100 in step 590.

As can be appreciated from the foregoing description, the CPNS server can individually manage a PNE and the PNE can actively join a PN. Therefore, a user of the PNE can also join the PN. Moreover, according to the present invention, the number of messages transmitted and received during authentication between the CPNS server and the PNE is reduced, reducing a load of a network resource.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for registering a Personal Network (PN) at a Personal Network Entity (PNE) which is provided with a service from a server in a Wide Area Network (WAN) through a Personal Network (PN) gateway, the method comprising:
   transmitting a PN connection request message to the server through the PN gateway;
   receiving an authentication request message from the server;
   determining whether a PN list including the PN gateway is in the received authentication request message; and
   if the PN list is included, transmitting an authentication response message including information about a joining PN to the server through the PN gateway.

2. The method of claim 1, wherein the PN list comprises:
   at least one of information about the PN gateway, PN identity information, and a list of at least one PNE connected to the PN gateway.

3. The method of claim 1, further comprising:
   receiving a response to an authentication query included in the received authentication request message; and
   generating an authentication response message including the response to the authentication query.

4. The method of claim 3, further comprising:
   if the PN list is not included, transmitting the authentication response message including the response to the authentication query to the server through the PN gateway.

5. The method of claim 1, further comprising:
   if the PN list is included, receiving a selection about the joining PN from a user of the PNE.

6. The method of claim 2, wherein the information about the joining PN is one of the PN identity information and a request to establish a new PN.

7. The method of claim 6, further comprising:
   after transmitting the authentication response message, receiving a message indicating that the PNE has joined a PN corresponding to the PN identity information or a message indicating that registration of the PNE as the new PN has been completed, from the server through the PN gateway.

8. A Personal Network Entity (PNE) which is provided with a service from a server in a Wide Area Network (WAN) through a Personal Network (PN) gateway, the PNE comprising:
   a Near-field Communication (NFC) module for communicating with the PN gateway;
   a PN connection controller for transmitting a PN connection request message to the server through the PN gateway; and
   an authenticator for, upon receipt of an authentication request message from the server, receiving a response to an authentication query included in the received authentication request message and generating an authentication response message including the acquired response to the authentication query,
   wherein the PN connection controller determines whether a PN list including the PN gateway is included in the received authentication request message and if the PN list is included, inserts information about a joining PN into the authentication response message and transmits the authentication response message to the server through the PN gateway.

9. The PNE of claim 8, wherein the PN list comprises:
   at least one of information about the PN gateway, PN identity information, and a list of at least one PNE connected to the PN gateway.

10. The PNE of claim 9, further comprising:
    an input unit for receiving a selection of one of the PN identity information and a request to establish a new PN from a user of the PNE.

\* \* \* \* \*